United States Patent [19]

Kawiecki

[11] E Re. 28,619

[45] Reissued Nov. 18, 1975

[54] UNITARY SERIES SPARK GAP WITH ALIGNED APERTURES

[75] Inventor: Chester J. Kawiecki, Santa Barbara, Calif.

[73] Assignee: Joslyn Mfg. and Supply Co., Chicago, Ill.

[22] Filed: Nov. 12, 1973

[21] Appl. No.: 414,858

Related U.S. Patent Documents

Reissue of:

[64] Patent No.: 3,535,825
Issued: Oct. 20, 1970
Appl. No.: 713,919
Filed: Mar. 18, 1968

U.S. Applications:

[63] Continuation of Ser. No. 298,014, Oct. 16, 1972.

[52] U.S. Cl. ..... 315/203; 313/325; 317/69

[51] Int. Cl. ..... H05g 41/14

[58] Field of Search ..... 315/36, 189; 313/196, 217, 313/220, 325, 203, 311, 306, 268, 257

[56] References Cited

UNITED STATES PATENTS

| | | | |
|---|---|---|---|
| 1,754,158 | 4/1930 | Goodwin | 315/36 |
| 2,290,526 | 4/1941 | Berkey et al. | 313/203 |
| 2,365,595 | 1/1939 | Roman | 313/268 |
| 3,303,381 | 2/1967 | Yarmovsky | 315/36 |
| 3,382,402 | 5/1968 | Lafferty | 315/36 |

*Primary Examiner*—Nathan Kaufman
*Attorney, Agent, or Firm*—Klarquist, Sparkman, Campbell, Leigh, Hall & Whinston

[57] ABSTRACT

A spark-gap device includes first and second pairs of conductive electrodes supported within first and second insulating spacer means to provide first and second gaps. The gaps are connected in series by joining the rearward portion of one electrode of the first pair to the rearward portion of one electrode of the second pair. The joined electrodes are hollow to provide a chamber therebetween, and are apertured so that an arc discharge at one gap provides illumination of the second gap. As a result of illumination of one gap by a discharge at the other, the gaps break down at substantially the same time. Furthermore, the chamber between the gaps aids in rapidly extinguishing an arc at the first current zero after an over-voltage condition subsides.

15 Claims, 5 Drawing Figures

CHESTER J. KAWIECKI
*INVENTOR*

*BY*
*BUCKHORN, BLORE, KLARQUIST & SPARKMAN*
*ATTORNEYS*

UNITARY SERIES SPARK GAP WITH ALIGNED APERTURES

*This application is a continuation of Ser. No. 298,014, filed Oct. 16, 1972, which is a reissue of U.S. Pat. No. 3,535,582.*

BACKGROUND OF THE INVENTION

Spark-gap devices are frequently employed as transient protectors across voltage supply lines for protecting electrical equipment from transient surges. For example, such a spark-gap device may be employed as a lightning arrestor providing a breakdown path from line to line, or line to ground, when a lightning surge occurs. Therefore the surge does not reach [the] *and* destroy electrical equipment also connected to the line.

It would be desirable to provide protection at a voltage not much higher than rated line voltage, with discontinuance of the short circuit substantially immediately after the overvoltage condition subsides. That is, a spark-gap device on an alternating current system should extinguish the arc by the time of the first current zero after a line surge disappears. By way of example, a spark-gap device set to provide a discharge when the line voltage reaches 350 volts peak should extinguish when the line voltage returns to a 170 volt peak, or 120 volt R.M.S., line voltage. Unfortunately, the ordinary gap set for such a low breakdown voltage would restrike in response to the normally impressed operating voltage resulting in failure of the spark-gap device. Consequently, a spark-gap device must ordinarily be set for quite a high breakdown voltage if it is to extinguish at normal operating voltages.

SUMMARY OF THE INVENTION

Briefly, in accordance with the present invention a spark-gap device includes first and second pairs of spark-gap electrodes connected in series. The device is constructed such that an arc discharge across one gap causes illumination of the other gap whereby the two gaps break down substantially simultaneously upon the occurrence of an overvoltage condition thereacross. Furthermore, an enclosed chamber communicates with the gaps to promote extinguishing of the arc discharge after the cessation of the overvoltage condition. In accordance with a preferred embodiment, one electrode of each pair is apertured, and the apertured electrodes are joined for providing a passage therethrough acting not only to establish illumination of one gap by the other, but also providing an enclosed chamber which promotes extinguishing of an arc discharge after the overvoltage condition is removed.

It is accordingly an object of the present invention to provide an improved spark-gap device for furnishing enhanced overvoltage protection.

It is another object of the present invention to provide an improved spark-gap device which will break down and protect a voltage supply line at a comparatively low overvoltage value, and which will extinguish the arc at the cessation of such overvoltage condition.

The present invention, both as to organization and method of operation, together with further advantages and objects thereof may best be understood by reference to the following description taken in connection with the accompanying drawings wherein like reference characters refer to like elements.

DRAWINGS

DETAILED DESCRIPTION

Figure 1:
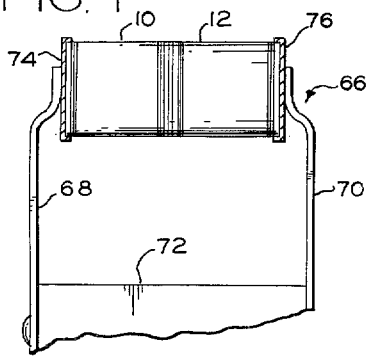
FIG. 1 is a side view of a spark-gap device according to the present invention as supported in a holder.
Figure 3:
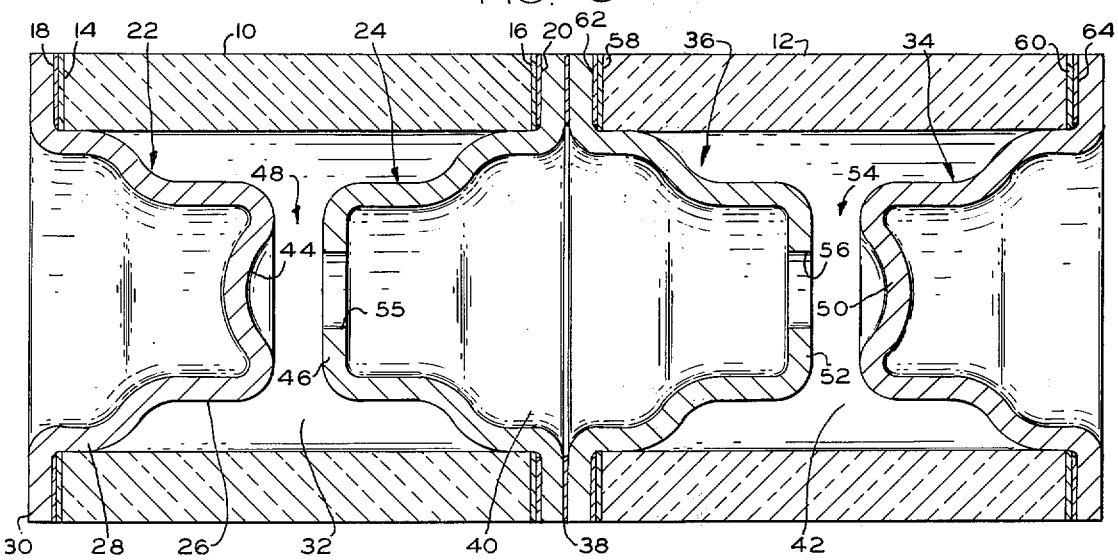
FIG. 3 is an enlarged longitudinal cross section of a spark-gap device according to the present invention.

Referring to the drawings, and particularly to FIGS. 1 and 3, a spark-gap according to the present invention includes cylindrical spacer tubes 10 and 12 preferably taking the form of ceramic tubes. The device is quite small, and each of the cylindrical spacer tubes may be approximately five-sixteenths inch in diameter and approximately five-sixteenths inch in length. The spacer tubes are most clearly shown in FIG. 3 wherein the spark-gap device according to the present invention is illustrated in greatly enlarged cross section. In assembling the spark-gap device according to the present invention, the ends of a ceramic spacer tube, for example tube 10, are suitably metalized as indicated at 14 and 16 with a high temperature metal or alloy, i.e. molybdenum plus manganese. Brazing washers 18 and 20, which may be formed of an alloy of silver and copper, are suitably positioned upon the metalized ends. Then, thin-walled hollow electrodes 22 and 24 are inserted into either end of ceramic tube 10, each of these electrodes being substantially cylindrical in shape. For example, electrode 22 has a first inner length 26 having a first diameter, and a second or outer length 28 of a larger diameter which approaches the inside diameter of ceramic tube 10. The electrode is also provided with an annular flange 30 at its outer end for making contact with brazing washer 18. Between length 26 and length 28 of the electrode, the diameter thereof changes gradually to provide a flared configuration, or a configuration adapted to provide a "bellows" action between the electrode and the ceramic spacer tube as when thermal expansion and contraction of the members take place. The thin-walled hollow electrodes 22 and 24 are preferably formed of Kovar, and the ceramic spacer tubes are preferably alumina. A chamber 32 is provided by the above construction between tube 10 and electrodes 22 and 24.

The spark-gap device also includes hollow electrodes 34 and 36, substantially identical to electrodes 22 and 24, respectively, which are inserted within spacer tube 12. As in the case of joining electrodes 22 and 24 to spacer tube 10 to provide chamber 32, joinder of electrodes 34 and 36 to tube 12 provides interior chamber 42. Ceramic tube 12 is metalized as indicated at 58 and 60, while brazing washers 62 and 64 are located between the spacer tube and the respective electrodes. The materials employed for electrodes and for brazing elements are suitably the same as hereinbefore described in connection with electrodes 22 and 24, and tube 10.

Hollow electrodes 24 and 36 are juxtaposed, and a further brazing washer 38 is included in the assembly between the flanges of electrodes 24 and 36 whereby these electrodes are joined together in a series circuit.

There is thereby also formed a chamber 40 substantially separate from the region of the gaps within and between the hollow electrodes 24 and 36.

Electrodes 22 and 24 include end portions or end walls 44 and 46 which face one another and define a first gap 48 therebetween. Electrode end wall 44 is suitably slightly cup-shaped or concave where it faces electrode 46 for the reception of a deposit of low work function material. Similarly, electrodes 34 and 36 have end portions or end walls 50 and 52 which face one another to define a gap 54 therebetween, and electrode 34 is suitably cup-shaped. The end walls 46 and 52 of electrodes 24 and 36 are respectively provided with apertures 55 and 56 centrally facing the gap region which provide communication between chamber 40 and the region of the gaps, and which are aligned so that illumination taking place at one gap will also illuminate the opposite gap. No other communication besides apertures 55 and 56 is desirable between chambers 32, 40, and 42.

To secure the various electrodes within spacer tubes 10 and 12, the assembly of components as described, with brazing washers in place, is raised in temperature to braze the assembly. The interiors of the chambers are evacuated and suitably provided with an internal gaseous environment at less than atmospheric pressure. The chambers 32, 40, and 42 are hermetically sealed, and communicate only with one another through apertures 55 and 56.

The spark-gap device according to the present invention is suitably supported and connected to circuitry to be protected employing a holder generally indicated at 66 including spring clips 68 and 70 joined at insulated base 72 as illustrated in FIG. 1. Spring clips 68 and 70 terminate in caps 74 and 76, shown in cross section in FIG. 1, employed for engaging the end flanges of the spark-gap device. The spring clips 68 and 70 are adapted to urge the caps against the end flanges to make good contact therewith, but are not required to form a hermetically sealed contact.

Figure 2:
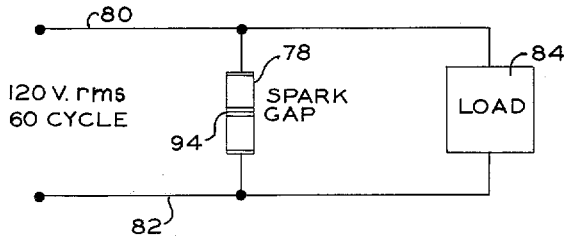
FIG. 2 is a circuit diagram illustrating application of a spark-gap device according to the present invention.

A spark-gap according to the present invention is connected to a line to be protected or between a line and ground by means of spring clips 68 and 70. A connection for a spark-gap device 78 according to the present invention is illustrated in FIG. 2 where end terminals thereof are connected respectively to voltage supply lines 80 and 82 extending from a source of power to a load 84. When a predetermined voltage level is reached, e.g. as a result of a high voltage transient on the line, gaps 48 and 54 break down into an arc discharge, thereby shorting out the high voltage transient, and protecting load 84 and other equipment on the line. The gaps 48 and 54 are suitably spaced such and the pressurization within the spark-gap device is predetermined such that an arc discharge occurs across gaps 48 and 54 at a relatively low overvoltage value. To use the previous example, spark-gap device 78 may be set to break down at an overvoltage condition of 350 volts peak across a line where the operating voltage is 120 volts R.M.S. or approximately 170 volts peak. Since the gaps 48 and 54 are connected in series, an arc discharge takes place across both gaps at approximately the same time. However, except for the passage provided by apertures 55 and 56 and chamber 40, there would be an excessive time lag before completion of an arc discharge. Both gaps would have to fire separately and their respective time lags would add. With the present device, substantially simultaneous ionization takes place at both gaps as a result of the passage formed by apertures 55 and 56, and chamber 40. Not only does direct gas ionization take place through the passage, but also the initiation of an arc discharge across one gap provides radiation illuminating the region of the other gap. This illumination produces photoelectrons at an electrode of the opposite gap, which in turn cause ionization of the gas in the region of such gap. For example, assuming gap 54 is the first to break down, the arc discharge at gap 54 will illuminate end portion 44 of electrode 22 through apertures 56 and 55. The photons reaching portion 44 will produce photoelectrons which will be emitted from portion 44 and which, in turn, will cause ionization of gap 48. As a result, gap 48 breaks down substantially immediately into an arc discharge. The time lag during which the foregoing events take place is such that both gaps break down at substantially the same time. The terms illumination and radiation employed above are meant to comprehend ultraviolet and/or visible radiation.

A further important advantage of the present invention relates to extinguishing of the arc discharge when an overvoltage condition is removed. For example, assume the voltage between voltage supply lines 80 and 82 in FIG. 2 drops from an overvoltage of 350 volts peak to a normal 170 volts peak for a 120 volt supply line. At the occurrence of the next current zero, that is, when the alternating current wave next passes through the zero axis, the arc extinguishes at each of the gaps. The arcs do not then restrike as the line voltage again rises to a normal 170 volts peak value. By way of explanation, it will be noted that three separate gas chambers are provided within the device of the present invention, namely, chambers 32, 40, and 42. The three separate gas chambers appear to break up the ionized gas channel, causing faster deionization at the end of an overvoltage condition. Moreover, the gas in chamber 40, communicating with the region of the gaps, is much cooler, and not ionized to the same degree as the gases in chambers 32 and 42. At the occurrence of the first current zero after an overvoltage condition is removed, the ionized gas appears to be replaced or intermixed with cooler gas through apertures 55 and 56 whereby the gaps do not restrike. The above explanations are postulated as possible reasons why the present construction is efficacious in extinguishing a discharge after an overvoltage condition is passed, and it is understood the invention is not limited to any given theory of operation.

Figure 4:
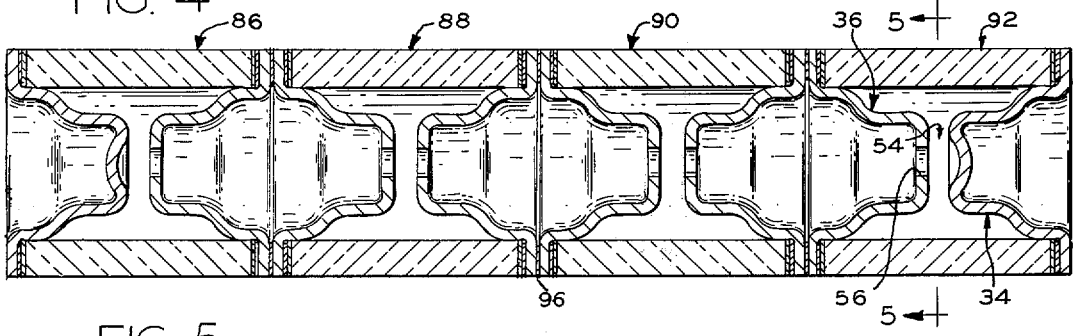
FIG. 4 is an enlarged longitudinal cross section of an extended spark-gap device according to the present invention.
Figure 5:
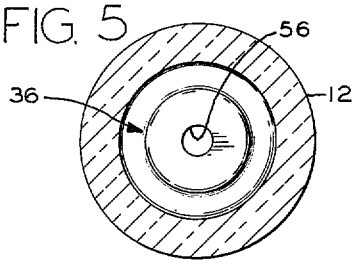
FIG. 5 is a transverse cross sectional view of the FIG. 1 spark-gap device taken at 5—5 in FIG. 4.

The construction according to the present invention may be expanded as illustrated in FIG. 4 wherein a spark-gap device includes four individual gap devices, 86, 88, 90, and 92 joined in a series construction. This configuration is suitable for higher voltage applications than would be the double gap illustrated in FIGS. 1 and 3. Construction and operation are substantially the same as hereinbefore described in connection with the embodiment of FIGS. 1 and 3. All electrodes except the end electrodes are apertured to provide interconnecting chambers between gaps, as well as a passage for the illumination of the several gaps by a first gap to break down, whereby discharge will then substantially take place at all gaps. FIG. 5 is a cross sectional view taken at 5—5 in FIG. 4, and illustrates aperture 56 in electrode 36. The same cross section is equally illustrative of the device of FIGS. 1 and 3.

There is provided according to the present invention a small size spark-gap device which is suitably constructed to break down and provide an arc discharge at a relatively low transient voltage value, for example, at a value just above the normal peak voltage value occurring across a protected line. In the example given, the breakdown voltage was approximately twice the normal peak voltage across the protected line. At the conclusion of a high voltage transient, the spark-gap device according to the present invention substantially immediately extinguishes the arc, that is, the arc is extinguished at the occurrence of the next current zero of the alternating current wave and does not restrike.

The device according to the present invention is susceptible to variation without departing from the inventive concept. For example, although spark-gap device 78 in FIG. 2 is illustrated as being connected across a line, without connection of the floating electrodes indicated at 94, it is understood that such interconnection may in some instances be grounded. It is preferred, however, that a construction such as illustrated in FIG. 4 be employed in such instance, wherein center connection 96 is grounded with end connections of the device disposed across a voltage supply line.

Moreover, any number of individual gap devices may be arranged in a series construction of the type illustrated in FIG. 4, with four such devices being given only by way of example.

While I have shown and described preferred embodiments of my invention, it will be apparent to those skilled in the art that many other changes and modifications may be made without departing from my invention in its broader aspects. I therefore intend the appended claims to cover all such changes and modifications as fall within the true spirit and scope of my invention.

I claim:

1. A spark-gap device suitable for providing transient protection to a line above a predetermined voltage level, said device comprising:

a first pair of conductive electrodes, insulating spacer means positioning said first pair of electrodes with opposed portions thereof in facing relation for defining a first gap therebetween adapted to break down and support an arc discharge, a second pair of conductive electrodes, insulating spacer means positioning said second pair of electrodes with opposed portions [therof] *thereof* in facing relation for defining a second gap therebetween adapted to break down and support an arc discharge, one of said second pair of electrodes being electrically connected to one of said first pair of electrodes for providing a series circuit including said gaps, said device being constructed so that an arc discharge across one gap causes illumination of the other gap, and a first enclosed chamber substantially separate from the region of said gaps and communicating with the region of [at least one of] said gaps to promote extinguishing of an arc discharge across the said [one of said] gaps after the cessation of an over-voltage condition across said gaps in series [.],

*wherein said insulating spacer means cooperate with said electrodes to enclose the first and second gaps in second and third separate chambers respectively, said insulating spacer means being joined to the respective pairs of electrodes with which they form chambers to hermetically seal said second and third chambers except for communication with said first chamber.*

[2. The device according to claim 1 wherein said insulating spacer means cooperate with said electrodes to enclose the first and second gaps in second and third separate chambers respectively, said first enclosed chamber communicating with at least one of the other chambers.]

3. The device according to claim 1 wherein the connected electrodes are hollow and are joined to provide said first enclosed chamber *which is hermetically sealed except for communication with said second and third chambers*, said connected electrodes being provided with apertures through portions thereof adjacent said gaps to communicate with said gaps.

4. The device according to claim 3 wherein said electrodes are longitudinally aligned so that said apertures in said connected electrodes provide a line-of-sight path between opposed portions of the remaining electrodes.

5. A spark-gap device suitable for providing transient protection to a line above a predetermined voltage level, said device comprising:

a first hollow enclosure means provided with a first pair of aligned conductive electrodes extending into said first hollow enclosure means and completing a first chamber therewith, said first pair of electrodes having adjacent opposed portions defining a first gap therebetween within said first chamber, and a second hollow enclosure means provided with a second pair of aligned conductive electrodes extending into said second enclosure means and completing a second chamber therewith, said second pair of electrodes having adjacent opposed portions defining a second gap therebetween within said second chamber, one electrode of said first pair of one electrode of said second pair being connected to provide a series electrical circuit including said gaps, said connected electrodes being provided with a direct passage between said first and second gaps for providing illumination of at least a portion of one of said gaps by an arc discharge occurring across the other of said gaps, said passage comprising a third chamber communicating with the region of the gaps in said first and second chambers [.],

*said hollow enclosure means being joined to the respective electrodes they enclose to hermetically seal said first and second chambers except for communication with said third chamber.*

[6. The device according to claim 5 wherein said hollow enclosure means are joined to the respective electrodes they enclose to provide hermetically sealed chambers therewithin except for communication with said third chamber.]

7. The device according to claim [6] *5* wherein said connected electrodes are hollow and are sealed back-to-back to [provide a] *hermetically seal said* third chamber [which is hermetically sealed] except for communication with said first and second chambers, said connected electrodes being centrally apertured at said gaps to complete said direct passage.

8. The device according to claim 5 wherein said enclosure means comprise spacer means and wherein said spacer means and said electrodes are substantially cylindrical, hollow, and aligned, each electrode having an end portion adjacent and forming an arc-supporting surface of one of said gaps within a respective spacer means, a first length of each such electrode next to the end portion having a first diameter, a second length of such electrode having a second and larger diameter where such electrode is provided with an annular flange joined to an end of a respective spacer [melber] *member*, and a third length of changing diameter joining said first and second lengths, said connected electrodes being joined at their annular flanges in substantial alignment to form said third chamber therewithin and being centrally apertured at said gaps to complete said direct passage.

9. The device according to claim 8 wherein said spacer members are formed of ceramic, with said annular flange of each said electrode being brazed to an end of a spacer member, and wherein the annular flanges of said connected electrodes are brazed together.

10. The device according to claim 5 wherein said connected electrodes are substantially aligned and hollow, extending longitudinally within the respective enclosure means to form said third chamber, and are provided with apertures where they face the remaining electrodes to complete said passage, said apertures providing a line-of-sight path between facing portions of the remaining electrodes and communication with said third chamber.

[11. The device according to claim 10 including further enclosure means and further electrodes extending therewithin in longitudinal alignment with said first and second enclosure means, each further electrode being apertured except for an end electrode, and with the rearward portion of each electrode being joined to the next except for an end electrode.]

12. The device according to claim 1 wherein said [insulating spacer means cooperate with said electrodes to enclose said first and second gaps in second and third chambers respectively, said] connected electrodes [being hollow and protruding] *protrude* within the respective spacer means while being joined to provide said first enclosed chamber, said connected electrodes being provided with aligned apertures adjacent said gaps.

*13. A spark gap device suitable for providing transient protection to a line above a predetermined voltage level, said device comprising:*

*a first hollow enclosure means provided with a first pair of aligned conductive electrodes extending into said first hollow enclosure means and completing a first chamber therewith, said first pair of electrodes having adjacent opposed portions defining a first gap therebetween within said first chamber,*

*and a second hollow enclosure means provided with a second pair of aligned conductive electrodes extending into said second enclosure means and completing a second chamber therewith, said second pair of electrodes having adjacent opposed portions defining a second gap therebetween within said second chamber,*

*one electrode of said first pair and one electrode of said second pair being unitary to provide a series electrical circuit including said gaps,*

*said one electrode of said first pair and said one electrode of said second pair being provided with a direct passage between said first and second gaps for providing illumination of at least a portion of one of said gaps by an arc discharge occurring across the other of said gaps,*

*said hollow enclosure means being joined to the respective electrodes extending therewithin to hermetically seal said first and second chambers except for said direct passage.*

*14. A spark gap device suitable for providing transient protection to a line above a predetermined voltage level, said device comprising:*

*a first hollow enclosure means provided with a first pair of aligned conductive electrode means completing a first chamber therewith, said first pair of electrode means having adjacent opposed portions defining a first gap therebetween within said first chamber,*

*and a second hollow enclosure means provided with a second pair of aligned conductive electrode means completing a second chamber with said second hollow enclosure means, said second pair of electrode means having adjacent opposed portions defining a second gap therebetween within said second chamber,*

*one electrode means of said first pair being unitary with one electrode means of said second pair, the remaining electrode means of said pairs extending into the respective hollow enclosure means,*

*said unitary electrode means being provided with a direct passage between said first and second gaps for providing illumination of at least a portion of one of said gaps by an arc discharge occurring across the other of said gaps,*

*said hollow enclosure means being joined to the respective electrode means with which they complete a chamber to hermetically seal said first and second chambers except for said direct passage.*

*15. A spark gap device suitable for providing transient protection to a line above a predetermined voltage level, said device comprising:*

*first and second aligned conductive electrode means, and a first hollow enclosure means therebetween completing a first chamber with said first and second electrode means, said first and second electrode means having adjacent opposed portions defining a first gap therebetween within said first chamber, said first conductive electrode means extending into said first hollow enclosure means,*

*a third electrode means aligned with the first and second electrode means, and a second hollow enclosure means between the second and third electrode means completing a second chamber with the second and third electrode means, said second and third electrode means having adjacent opposed portions defining a second gap therebetween within said second chamber, said third conductive electrode means extending into said second hollow enclosure means,*

*said second electrode means being provided with a direct passage between said first and second gaps for providing illumination of at least a portion of one of said gaps by the arc discharge occurring across the other of said gaps,*

*said hollow enclosure means being joined to the respective electrode means with which they complete a chamber to hermetically seal said first and second chambers except for said direct passage.*

*16. The device according to claim 15 wherein said first and third electrode means are disposed in juxtaposed facing spaced relation in the longitudinal direction of said device, with the second electrode means forming a barrier therebetween except for said direct passage, said first and second gaps being formed between lateral exposed faces*

*of said second electrode means and the said first and third electrode means respectively.*

*17. The device according to claim 15 wherein said enclosure means comprise spacer means and are substantially cylindrical, hollow, and aligned, said electrode means extending within said enclosure means also being substantially hollow and aligned, each having an end portion adjacent and forming an arc supporting surface of one of said gaps within a respective enclosure means, and each being provided with an annular flange joined to an end of the respective enclosure means.*

*18. A spark-gap device sutiable for providing transient protection to a line above a predetermined voltage level, said device comprising:*

*a first hollow enclosure means provided with a first pair of aligned conductive electrodes extending into said first hollow enclosure means and completing a first chamber therewith, said first pair of electrodes having adjacent opposed portions defining a first gap therebetween within said first chamber,*

*a second hollow enclosure means provided with a second pair of aligned conductive electrodes extending into said second enclosure means and completing a second chamber therewith, said second pair of electrodes having adjacent opposed portions defining a second gap therebetween within said second chamber,*

*one electrode of said first pair and one electrode of said second pair being connected to provide a series electrical circuit including said gaps,*

*said connected electrodes being substantially aligned and hollow, extending longitudinally within the respective enclosure means to form a third chamber,*

*and further enclosure means and further electrodes extending therewithin in longitudinal alignment with said first and second enclosure means for providing further gaps in further chambers,*

*each electrode being apertured except for end electrodes, and with the rearward portion of each electrode being joined to the next except for end electrodes,*

*said apertures providing a direct line-of-sight passage between gaps for providing illumination therebetween when an arc discharge occurs across at least one of said gaps,*

*said hollow enclosure means being joined to the respective electrodes they enclose to hermetically seal the chambers formed thereby except for communication between chambers provided by said apertures.*

* * * * *